United States Patent

Knight

[15] 3,657,813
[45] Apr. 25, 1972

[54] POWERED TREE PRUNING SAW

[72] Inventor: Erwin C. Knight, Watertown, Wis.

[73] Assignee: McGraw-Edison Company, Elgin, Ill.

[22] Filed: Nov. 29, 1968

[21] Appl. No.: 779,803

[52] U.S. Cl. ................................................30/166, 30/296
[51] Int. Cl. .........................................................B26b 27/00
[58] Field of Search....................30/144, 166, 267, 228, 272, 30/296, 215, 216

[56] References Cited

UNITED STATES PATENTS

| | | | |
|---|---|---|---|
| 1,520,330 | 12/1924 | Chinn | 30/167 |
| 2,337,769 | 12/1943 | Redenbo | 30/166 |
| 2,431,235 | 11/1947 | Flaa | 30/166 X |
| 2,563,264 | 8/1951 | Norgard | 30/166 |
| 2,748,476 | 6/1956 | Cooper | 30/167 |
| 2,814,110 | 11/1957 | Ackley et al. | 30/167 |
| 3,453,732 | 7/1969 | Wilkin | 30/296 |

*Primary Examiner*—Granville Y. Custer, Jr.
*Attorney*—Charles F. Lind

[57] ABSTRACT

A portable powered pruning saw including a power housing having a powered rotatable output shaft; a saw housing having a motion converting mechanism with a rotatable input shaft and a reciprocating output element, and a saw blade reciprocated by the output element; one or more pole extension elements interconnecting the power and saw housings and each including a rotatable shaft, and coupling means to rotatably key all shafts together; a guide on the saw housing including spaced arms that transversely straddle the saw blade with blade guide means thereon engaging opposite sides of the saw blade and with a limb engaging edge adjacent the cutting edge of the saw blade; and handle means including a hand grip on the pole extension element adjacent the power housing, and a shoulder strap from the hand grip adapted to be draped over the head and shoulder of the user.

Home ownership and leisure time, both being on the increase, provide ample opportunity for outdoor gardening enterprises. Power garden tools are generally available to permit an individual to maintain such things as lawn and hedges neatly trimmed with a minimum of physical effort. However, heretofore no suitable powered portable tree pruning saw has been available, particularly one economical and safe enough to permit an amateur to buy, assemble, use and disassemble.

9 Claims, 9 Drawing Figures

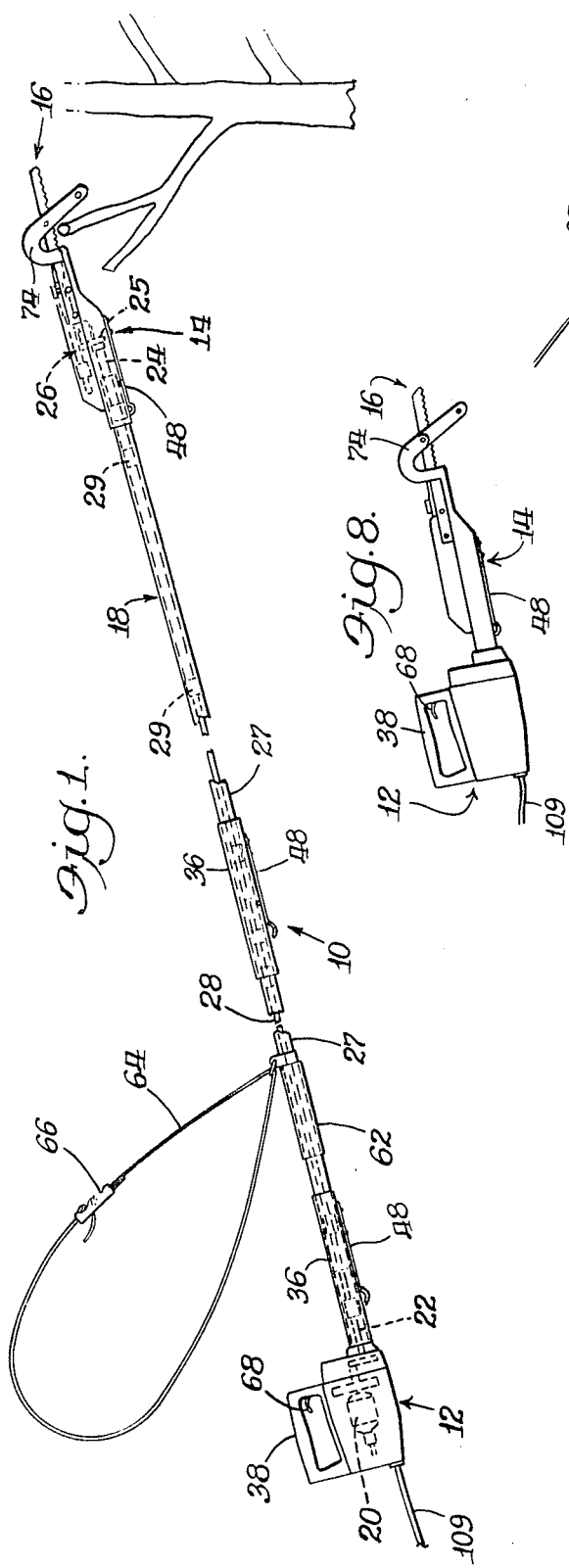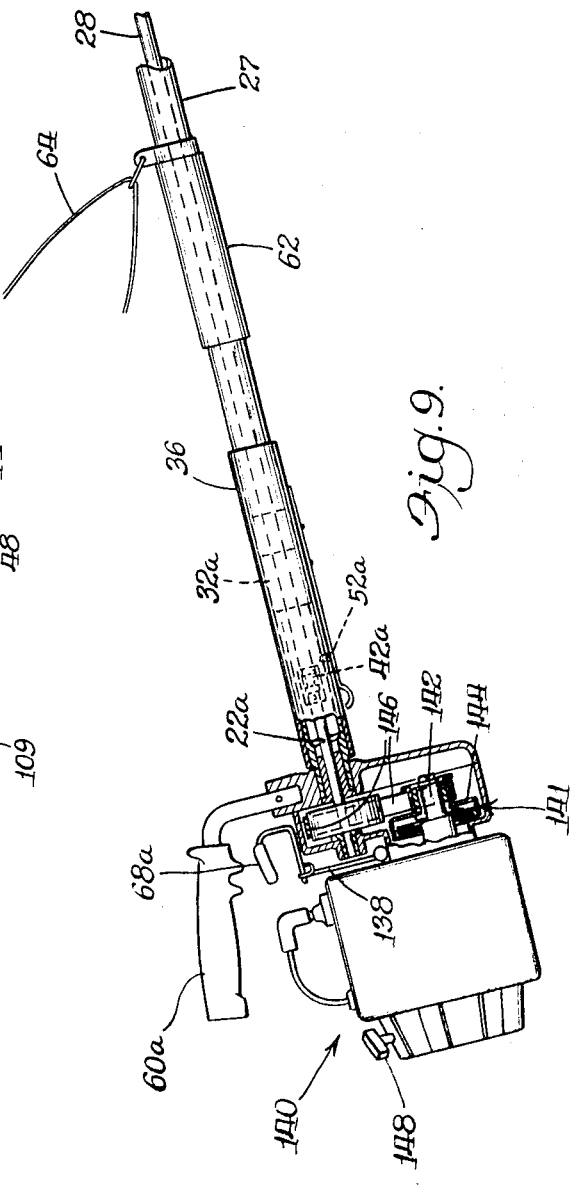
Inventor:
Erwin C. Knight
By Charles F. Lind  Atty.

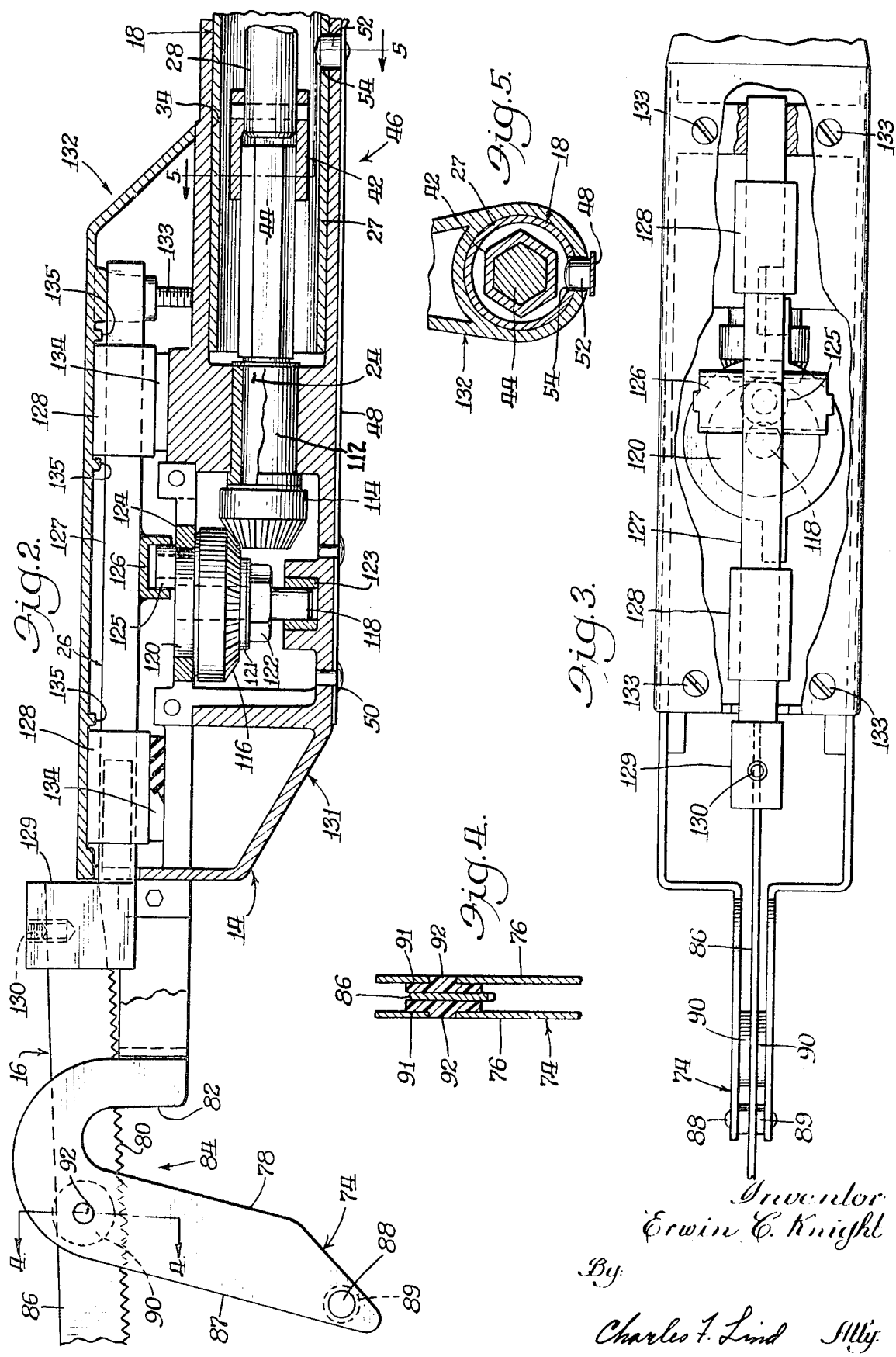

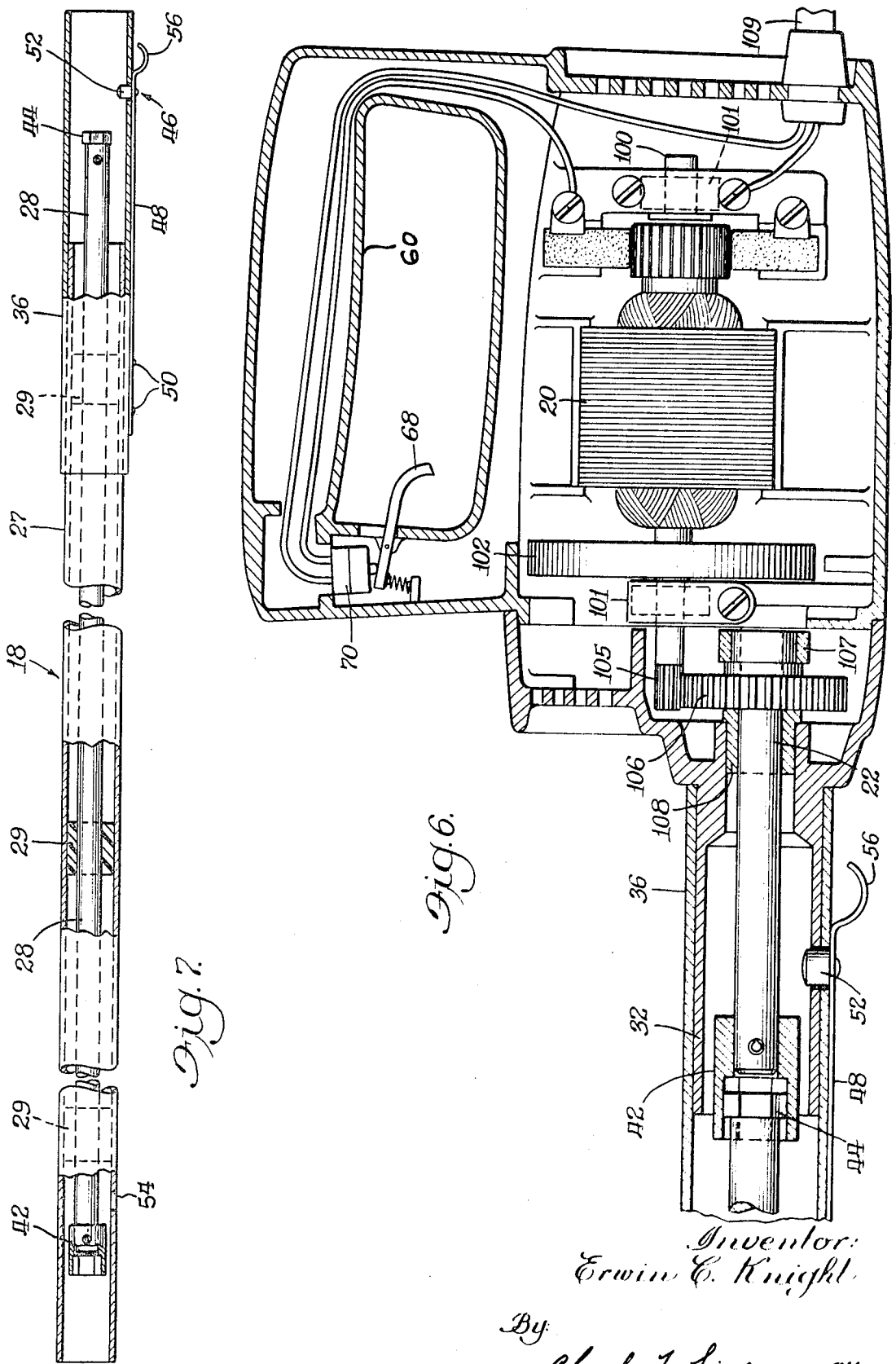

POWERED TREE PRUNING SAW

This invention relates to a portable powered pruning saw of economical and light weight design that can be dependably operated by both an inexperienced home owner and a professional tree pruner. The portable powered pruning saw has a power housing with a powered rotatable output shaft, a saw housing with a rotatable input shaft and a reciprocatable output element to which a saw blade is secured to be reciprocated thereby, and one or more pole extension elements connected between the two housings and having inner rotatable shaft elements keyed together and to the housing shafts to transmit power to the saw blade. The subject mechanism is light in weight and has spaced handles including an adjustable upper handle and a shoulder sling connected thereto for providing easy and accurate guiding of the saw blade against a limb even a considerable distance from the user. One or more of the pole extension elements can be used to provide for pruning at adjustable distances from the user, and the unit can be easily disassembled when not in use for compact storing.

One object of this invention is to provide a portable powered pruning saw for trimming limbs at adjustably remote locations within finite limits from the user, with means to support the saw easily and accurately.

A more detailed object of this invention is to provide a portable tree pruning saw having separable pole extension elements that releasably support a saw housing remotely of a power housing, the power housing being hand held by the user and having a powered rotatable output shaft, the saw housing having a rotatable input shaft, a motion converter, and a reciprocating output element secured to the saw blade, and each pole extension element having rotatable shaft means that are releasably keyed to each other and to the housing shafts to transmit power to the saw blade.

Another object of this invention is to provide in a portable powered tree pruning saw according to the preceeding object a plurality of like pole extension elements and means for releasably connecting the pole extension elements to one another and to the housings and for releasably keying the rotatable shaft means and shafts together, providing adjustment of the remoteness of the saw blade from the hand housing merely by varying within limits the number of pole extension elements used in the saw.

These and other objects of this invention will be more fully understood after reviewing the following specification, including the accompanying drawings as a part thereof, wherein:

FIG. 1 is an elevational view showing the subject portable powered pruning saw in a typical operational assembly;

FIG. 2 is a sectional view, as seen generally from the longitudinal center, of the saw housing in the device of FIG. 1;

FIG. 3 is a top plan view of the unit shown in FIG. 2, with part of the structure being broken away to more clearly disclose the subject;

FIGS. 4 and 5 are sectional views as seen generally from lines 4—4 and 5—5, respectively, in FIG. 2;

FIG. 6 is a sectional view, as seen generally from the longitudinal center, of the power housing in the device of FIG. 1;

FIG. 7 is an elevational view, partly broken away and in longitudinal section, of a typical pole extension element;

FIG. 8 is an elevational view, similar to FIG. 1, except showing the unit with all of the pole extension elements removed; and FIG. 9 is an elevational view, similar to FIG. 1, of an alternate embodiment of the subject pruning device.

Referring now specifically to FIG. 1, one embodiment of the subject portable powered pruning saw 10 is shown. The saw 10 includes a power housing 12, a saw housing 14, a saw blade 16 reciprocated from the saw housing, and at least one pole extension element 18 connected between the housings 12 and 14. The power housing 12 shown has an electric motor 20 which is connected to a rotatable output shaft 22 from the housing. The saw housing in turn has a rotatable input shaft 24, and a motion converter 25 driven by the input shaft and having a reciprocating output element 26 to which the saw blade 16 is connected. Each pole extension element 18 has an outer tube 27 and a drive shaft 28 rotatably supported therein on plastic bearings 29. The tubes are connected to like extension element tubes and to the housings for supporting the housings remotely of each other and the drive shafts are keyed to adjacent like drive shafts and to the housing shafts 22 and 24 for transmitting output power to the saw blade 16.

Each housing has a tubular element or socket extending generally concentric of its respective shaft, element 32 extending from the power housing and element 34 extending from the saw housing. To provide for possible connection of the housings to one another, the socket element 34 is made larger than the socket element 32 to telescopically cooperate therewith. Each pole extension element tube 27 is of similar exterior dimension as the interior socket element 32 and thus can telescope in the exterior socket element 34. A sleeve 36 similar in internal dimension to element 34 is secured to one end of each tube 27 to telescope in turn over either the unsleeved end of another tube 27 or over the socket element 32. The housing shafts 22 and 24 have interlocking couplings 42 and 44, respectively, and each pole extension element shaft 28 also has like couplings 42 and 44 such that the coupling at the sleeve end of the pole extension element is like the saw housing shaft coupling 44 and the opposite end pole extension element coupling is like the power housing shaft coupling 42.

A detent locking means 46 is provided between the socket elements to maintain them interlocked. A typical assembly is shown in FIG. 2 and includes a leaf spring 48 secured at one end by rivets 50 to the exterior socket element and supporting a pin 52 at the opposite end that fits through an opening in the exterior socket element and is releasably received in opening 54 on the interior socket element. The free end of the spring 48 further has a loop 56 for easy gripping of the spring to flex it to remove or engage the pin relative to the interior socket opening 54.

Since the interior and exterior socket elements and corresponding shaft coupling means of the housings and pole extension elements can cooperate with one another, one or more pole extension elements can be fitted between the two housings to separate the saw housing adjustable distances from the power housing and thereby provide for pruning of limbs at considerable distances from the user. Moreover, the housings themselves can be connected directly together to provide a small hand held saw mechanism shown in FIG. 8.

To hold the pruning saw, a user grasps lower handle 60 on the power housing 12 and either an upper handle sleeve 62 on the pole extension element or the pole extension element itself. The sleeve can be moved up and down the pole extension element and locked in place to suit the individual user. A strap 64 secured to the sleeve 62 and adjustable by buckle 66 is adapted to be draped over the shoulder and head of a user, which when properly adjusted supports the saw with minimal effort. Trigger element 68 connected to actuate electric switch 70 (FIG. 6) is located adjacent the handle to provide ON and OFF control of the saw.

A limb guide 74 secured to the saw housing adjacent the saw blade helps the user initially locate the saw blade relative to the limb to be cut and also holds the limb during cutting. The limb guide 74 includes a pair of spaced arms 76 which straddle with clearance the saw blade and which define guide edge 78 that extends transversely past the cutting edge 80 of the saw blade 16 at an angle forwardly and away from the cutting edge. The guide edge 78 can be positioned against the limb for initially locating the cut, without actually cutting the limb. By moving the saw away from the user toward the limb, the guide edge slides on the limb and the blade eventually engages the limb. The cutting stroke of the saw occurs when the blade is moved toward the saw housing 14, and a second edge 82 is provided spaced from and facing the guide edge 78 to define a notch 84 therebetween to receive and thereby retain the limb to be cut. It is possible to cut limbs larger than the width of the notch 84 merely by locating the extension 86 of the saw 16 beyond the limb guide 74 against the limb to be cut and holding the guide edge 87 against the limb.

The free end of the arms are held spaced apart by spacer 89 with a rivet 88 through the spacer 89 and arms providing a rigid guide. Saw blade guide elements 90 are confined between the spaced arms on opposite sides of the saw blade spaced from the cutting edge 80 and serve to center the saw blade with the limb guide 74. The blade element guides 90 include typically (FIG. 4) sintered bearing metal elements of button configuration each having a relatively large face 91 which engages the saw blade and a smaller boss 92 which fits in a cooperating opening on the arm. The cutting edge 80 of the saw is tilted in a slightly downward direction so that the rearward cutting stroke moves the blade toward the limb and the forward return stroke lifts and frees the cutting edge of the blade from the limb to the extent it has already been cut.

Referring now to FIG. 6 showing the power housing, shaft 100 of the electric motor 20 is mounted in bearings 101 and cooling fan 102 is keyed to this shaft. The motor shaft 100 has pinion teeth 105 thereon which cooperates with a gear 106 keyed to the output shaft 22, and shaft 22 is rotatably mounted in bearings 107 and 108. This gives a speed reduction ratio of motor shaft r.p.m. to output shaft r.p.m. of approximately 5 to 1. Cord 109 from the housing is suited for connection with an exterior power supply (not shown) to provide with the switch 70 controlled power input to the motor 20.

The saw housing input shaft 24 (FIG. 2) is mounted rotatably in bushings 112 and a bevel gear 114 keyed to the shaft engages a second bevel gear 116 keyed to shaft 118. The gear 116 has an upper smooth surface that is biased against a complementary lower smooth surface of a cam element 120, and a spring washer 121 held by nut 122 on the shaft provides an adjustable spring force between these surfaces to form a mechanical slip clutch between gear 116 and cam element 120. The shaft 118 is rotatably mounted in bushing 123 and the cam element is rotatably mounted in bushing 124. A pin 125 extends upwardly from the cam element 120 and is received within cross guide 126 of an output element 127 mounted to reciprocate within slides 128. Bracket 129 is secured to the output element 127 and is effective upon adjustment of screw 130 to hold the saw blade 16 fixed to the output element. Rotation of the cam element 120 thus reciprocates the output element 127 and the saw blade 16 connected thereto with a stroke twice the offset between the pin 125 and shaft 118.

It has been found convenient to make the saw housing 14 with a bottom unit 131 and a removable cover unit 132 held together by bolts 133. The cam element bushing 124 is supported to the bottom unit, and the output element slides 128 are biased by rubber pads 134 against the cover unit 132 for confinement laterally thereon by ribs 135. The friction clutch can be adjusted by threading the nut 122 along the shaft 118 to provide a maximum force that can be transmitted between the rotating gear 116 and the rotating cam element 120 to eliminate possible motor damage should the saw blade become bound within the limb. The speed reduction ratio of pinion 114 to gear 116 is approximately 4 to 1.

An alternate embodiment of the subject saw is shown in FIG. 9, where an internal combustion engine 140 provides the power for the unit to permit the use of the saw at locations where electric power is not available. The saw would operate in a very similar manner, having a power housing output shaft 22a with coupling 42a and a concentrically arranged tubular socket element 32a having pin opening 52a. In addition, a throttle trigger 68a is provided adjacent the handle 60a and connects through appropriate linkage such as a push-pull cable 138 with a carburetor for adjusting the output power of the unit. In addition, a centrifugal clutch 141 is located between output shaft 142 of the engine and the output shaft 22a of the housing, the clutch typically consisting of a plurality of centrifugal elements rotated with shaft 142 and thrust against a drum 144 supported rotatably relative to the engine shaft. A power grip belt 146 extends between the output shaft 22a and the drum 144. A pull rope 148 is provided also for starting the engine 140.

The particular saw 10 can be used very effectively to trim limbs located even some distance away from the user. It is possible to separate and/or connect the pole extension elements 18 relative to one another and to the housings for varying the distance between the housings to whatever recognizable limits might be deemed necessary. Having the pole extension elements of approximately four foot length, for example, also provides easy handling and storing of these components. Moreover, having the motor and a partial speed reduction in the power housing near the user, having the power transmitted to the saw housing by relatively high speed rotation of the shafts in the pole extension elements, and having a further speed reduction in the saw housing minimize the weight of the saw and particularly that which must be supported in a cantilevered fashion. The spaced handles provide convenient support of the saw, and the adjustable shoulder sling removes to a great extent the holding effort required on the upper handle. The guide is effective to hold the saw blade relative to both the saw structure and the limb.

What is claimed is:

1. A portable powered pruning saw, comprising the combination of a power housing; power means carried in the power housing and having a rotatable output shaft; a saw housing; a motion converting mechanism in the saw housing and including a rotatable input shaft and a reciprocatable output element; first coupling means on the output shaft and second coupling means on the input shaft; said coupling means being engageable and adapted when engaged to rotatably interlock the shafts, a first socket element on the power housing and a second socket element on the saw housing, said elements being adapted when engaged to secure the housings relative to one another; said first and second coupling means and said first and second socket elements being readily concurrently engaged or separated as desired, and when engaged providing an operative unit; means releaseably maintaining the first and second coupling means and said first and second socket elements engaged; a saw blade; means connecting the saw blade to the reciprocatable output element to be driven thereby with the blade cantilevered in the direction away from the power housing; and a limb guide secured to the saw housing and having a near side guide edge that extends transversely past the blade cutting edge inclined slightly obtuse from the normal relative to the cutting edge in the direction away from the power housing and extended beyond the blade cutting edge a distance sufficient to permit the guide edge to be disposed against a limb without the blade cutting edge engaging the limb, said limb guide being formed of spaced arms that straddle the saw blade with clearance, and blade guide means supported by the limb guide arms to engage the opposite sides of the saw blade during the reciprocation thereof along locations spaced from the cutting edge and being operable to center and hold the blade within the limb guide arms.

2. A portable powered pruning saw according to claim 1, wherein the limb guide further has a far side edge that is inclined slightly acute from the normal relative to the blade cutting edge in the direction away from the saw housing, which far side edge extends beyond the cutting edge a distance sufficient to position the far side edge against a limb to be cut operable upon biasing against the limb to wedge the cutting edge against the limb.

3. A portable powered pruning saw according to claim 1, wherein a second edge is formed supported from the saw housing facing the near side guide edge but is separated therefrom toward the saw housing a short distance sufficient to define a notch of nominal size that can receive and hold therein a small twig or branch to be pruned, said second guide edge extending transversely away from the blade cutting edge but only a fraction of the distance as compared to the near side cutting edge.

4. A portable powered pruning saw according to claim 1, wherein the blade cutting edge extends at an angle slightly inclined from the direction of reciprocation towards its free end, and wherein the teeth on the cutting edge are such so as to cut primarily on a stroke of the blade in the direction towards the saw housing.

5. A portable powered pruning saw according to claim 1, further including a pole extension element having a shaft rotatably disposed therein, said pole extension element being adapted to be removably connected between the power and saw housings and having thereby a first socket element and a first shaft coupling means on one end thereof and a second socket element and a second shaft coupling means on the opposite end thereof, the pole extension element socket elements and shaft coupling means thereby being readily concurrently engaged with the housing socket elements and the input and output shaft coupling means; and means releasably maintaining the coupling means and the socket elements engaged.

6. A portable powered pruning saw, comprising the combination of a power housing; power means carried in the power housing and having a rotatable output shaft; a saw housing; a motion converting mechanism in the saw housing and including a rotatable input shaft and a reciprocatable output element; one or more pole extension elements each having a shaft rotatably disposed therein, said pole extension elements being adapted to be removably connected between the power and saw housings operable to secure the housings relative to one another at spaced locations along a line generally parallel to the reciprocation of the output element and further being operable to rotatably interlock the output and input shafts, the number of pole extension elements used being determined within limits by the desired spacing of the housings which thereby provides for pruning remote from the user; said housings and each pole extension element thereby having mutually interlocking socket elements and the shafts having mutually interlocking coupling means; a saw blade; means connecting the saw blade to the output element to be reciprocated therewith; and a limb guide supported from the saw housing and extending transversely past the cutting edge thereof at a slight angle from the normal thereto where the near side edge facing the power housing defines an obtuse angle relative to the cutting edge and to the direction of reciprocation of the output element and where the opposite far side edge defines an acute angle relative to the cutting edge, and where the guide side edges extend beyond the cutting edge a liberal distance sufficient to permit in the first place the near side edge to be rested against a limb to be pruned without the blade cutting edge engaging the limb for initial placement of the saw before cutting and to permit in the second place the far side edge to be biased against the limb to wedge the cutting edge against the limb.

7. A portable powered pruning saw according to claim 6, wherein a second guide edge is formed supported from the saw housing facing the near side guide edge but is separated therefrom toward the saw housing a short distance sufficient to define a notch of nominal size that can receive and hold therein a small twig or branch to be pruned, said second guide edge extending transversely away from the blade cutting edge but only a fraction of the distance as compared to the near side cutting edge.

8. A portable powered pruning saw according to claim 7, wherein the limb guide is formed of spaced arms that straddle the saw blade with clearance, and wherein blade guide means are supported by the limb guide arms to engage the opposite sides of the saw blade during the reciprocation thereof along locations spaced from the cutting edge and being operable to center and hold the blade within the limb guide arms.

9. A portable powered pruning saw, comprising the combination of a power housing having a powered rotatable output shaft; a saw housing having a rotatable input shaft and a reciprocatable output element; at least one pole extension element separably connected between the housing and mechanically interlocked therewith for supporting the housing at spaced locations along a line between the housings; shaft means mounted rotatably within each respective pole extension and including coupling means at each end thereof for rotatably interconnecting the output and input shafts; a saw blade reciprocated by the output element in a direction generally parallel to the line of separation of the housings and cantilevered from the saw housing in the direction away from the power housing; a limb guide secured to the saw housing and having a near side guide edge facing the power housing and a oppositely facing far side guide edge each of which extends transversely of the saw blade cutting edge for selective abutment against a limb to be cut and distances away from the cutting edge sufficient to permit the saw housing to be disposed against the limb without the saw blade cutting edge engaging the limb, said limb guide being angled relative to the saw blade cutting edge and the line of separation of the housings such that the angle between the cutting edge and near side edge is obtuse and the angle between the cutting edge and far side edge is acute; and first handle means on the power housing, second handle means located along the pole extension element adjacent the power housing, and a strap secured to the pole extension element at a location spaced from the power housing and adapted to be draped over the head and shoulder of the user.

* * * * *